United States Patent
Meier et al.

(10) Patent No.: US 11,964,414 B2
(45) Date of Patent: Apr. 23, 2024

(54) GUIDING AND CENTERING DEVICE

(71) Applicant: Agathon AG, Maschinenfabrik, Bellach (CH)

(72) Inventors: Christoph Meier, Roggwil (CH); Niklas Kaufmann, Bahlingen (DE); Stefan Nobs, Aarberg (CH)

(73) Assignee: AGATHON AG, MASCHINENFABRIK, Bellach (CH)

( * ) Notice: Subject to any disclaimer, the term of this patent is extended or adjusted under 35 U.S.C. 154(b) by 279 days.

(21) Appl. No.: 17/411,161

(22) Filed: Aug. 25, 2021

(65) Prior Publication Data

US 2022/0063159 A1 Mar. 3, 2022

(30) Foreign Application Priority Data

Sep. 3, 2020 (CH) .................................. 1086/20

(51) Int. Cl.
 *B29C 45/26* (2006.01)
(52) U.S. Cl.
 CPC ............................. *B29C 45/2606* (2013.01)
(58) Field of Classification Search
 CPC .................................................. B29C 45/2606
 See application file for complete search history.

(56) References Cited

U.S. PATENT DOCUMENTS 3,029,110 A * 4/1962 Hughes .................... F16C 29/04
 384/30
4,664,534 A * 5/1987 Hanaway ................ F16C 29/04
 384/49

(Continued)

FOREIGN PATENT DOCUMENTS

| EP | 2363263 A1 * | 9/2011 | ............. B22D 17/22 |
| EP | 2363263 A1 | 9/2011 | |
| JP | S 53133852 U * | 10/1978 | |

OTHER PUBLICATIONS

Thorlabs SM05 Reducing Retaining Ring (Year: 2015).*

*Primary Examiner* — Nahida Sultana
*Assistant Examiner* — Virak Nguon
(74) *Attorney, Agent, or Firm* — Pearne & Gordon LLP

(57) ABSTRACT

The present invention relates to a guiding and centering device (10) for a forming tool (2), in particular an injection molding or die-casting tool, comprising a first mold half (1) and a second mold half (5) which are guided by guide means (7) from a closed position in which the respective separating surfaces of both mold halves (1; 5) are pressed against one another into an opened position and vice versa. This guiding and centering device (10) comprises a protruding guiding body (4) formed as a circular cylindrical bolt (12) provided at the first mold half (1), a guiding recess (6) formed as a bush (14) with an circular cylindrical inner surface (20) provided at the second mold half (5) and a rolling element cage (16) with rolling elements (17) inserted in rows (18), by means of which the two mold halves (1; 5) are guided and precisely centered in the closed position. The rolling element cage (16) is supported by the circular cylindrical inner surface (20) of the bush (14) and positioned via positioning means (30) in such a way that when closing the forming tool the circular cylindrical bolt (12) runs practically simultaneously in a first row of rolling elements (18.1) and a second row of rolling elements (18.2) of the rolling element cage (16).

15 Claims, 4 Drawing Sheets

(56) References Cited

U.S. PATENT DOCUMENTS

2004/0043103 A1* 3/2004 Bokich .................. F16C 33/48
                                                                                                                            425/589
2009/0220631 A1* 9/2009 Bokich ................ B29C 33/303
                                                                                                                            425/168

* cited by examiner

GUIDING AND CENTERING DEVICE

TECHNICAL FIELD

The present invention relates to a guiding and centering device for guiding and aligning first and second mold halves. The guiding and centering device can be used in a forming tool such as an injection molding tool or a die-casting tool comprising a first mold half and a second mold half, wherein the first mold half and the second mold half are movably guided by guiding means from a closed position, in which the respective partition surfaces of the two mold halves are pressed together, into an opened position and vice versa. The guiding and centering device is formed from a plurality of protruding guide bodies attached to the first mold half and a plurality of guide recesses attached to the second mold half, through which the two mold halves are precisely guided into and centered in the closed position. In particular, the guiding and centering device according to the invention is preferably configured for guiding in combination with round fine centering used for individual guiding and centering of cavities, separation planes, plates with precise guidance and maximal load capacity from the centering start until the end.

BACKGROUND ART

Molding tools or generally forming tools comprising first mold half and second mold half are well known. In such molding tools, mold halves can be provided with several plates, depending on the complexity of the mold, which can be moved from a closed position to an open position and vice versa, guided by column guides. The mold positioned between the separated surfaces of the two mold halves is filled with a casting material, for example, which is pressed into the mold when the mold is closed.

Generally, guide devices comprise at least a bush or a sleeve provided on one of the mold halves presenting a first bearing surface and a guide column provided on the other of the mold halves presenting a second bearing surface and a bearing, adapted to act in bearing engagement between the bush and the guide pin or column to reduce sliding friction along the bearing surfaces when mating the members together. Therefore, the bush or sleeve is formed from a sliding bush providing a defined sliding surface. But common problems of sliding friction pairs are known including jittering or crawling because of unbalance friction on the sets of them, which may influence the workpiece's quality and service life of the guiding device.

Additionally, in order to obtain an accurate molding of molded products that meet appropriate standards and specifications, it is necessary that the two mold halves that form the mold are precisely aligned. However, this cannot be ensured to the desired extent by guide devices, in particular column guides in which the mold halves are guided. Therefore, a positioning device, also known as a centering device, is used, which ensures an exact alignment of one mold half in respect to the other mold half, in particular during the end of the stroke until the end point in the closed position is reached.

A typical centering device comprises a first member attached to one of the mold halves, configured as a guide pin or generally as a male portion and a second member attached to the other of the mold halves, configured as a bush or generally as a female portion. The first member and the second member mate together when the mold halves are closed together. The fit between the male and the female portions determines the magnitude of misalignment between the mold halves.

It is known from prior art to provide between a first bearing surface of the male portion and a second bearing surface of the female portion a replaceable insert configured as a bearing with rolling elements. In particular, such an insert is configured as a cage that rotatably supports a plurality of needle bearings or rolling elements to reduce friction along the bearing surfaces when mating the members together.

From EP 2 363 263 A a centering device is known, wherein a plurality of protruding bodies each formed as a cylindrical bolt on which a rolling element cage with rolling elements inserted in rows is placed, which is positioned via positioning means in the open state in such a way that a first row of rolling elements directed against the first mold half rests on the circular surface of the bolt and a second row of rolling elements rests against a circumferential edge terminating the circular cylindrical surface of the bolt and that each guide recess is formed from a sleeve with a circular cylindrical inner surface which runs up against the rolling elements of the rolling element cage when the mold is closed.

From US 2004/043103 A1 a bearing mechanism of a positioning device for reducing friction along bearing surfaces is known, which moves between a first position and a second position relative to at least one of a first member with the male portion or preferably of a second member with the female portion upon mating. A resilient member resiliently supports the bearing mechanism and a retainer is coupled to the bearing mechanisms for reacting against the resilient member configured as a spring when the bearing mechanism moves between the first and second positions. The spring acts as a biasing means upon the bearing mechanism. The retainer prevents the bearing mechanism from moving beyond a position in which only some of the rolling elements are free from the bearing surface supporting the rolling element cage.

Furthermore, different embodiments of retainers are known to prevent the bearing mechanism from slipping-off and out of the bush of the positioning device. For example, a locking member configured as a snap ring or the like can be provided at the inlet of the bush in order to hold the bearing mechanism in it. Alternatively, the cage with rolling elements can be configured with an outwardly projecting element which can engage an abutment surface on an internal surface of the bush.

In order to be able to obtain an accurate molding, it is necessary that the two mold halves that form the mold are precisely aligned, which often cannot be achieved with the guiding devices and the positioning devices known in the art. Still, there is a need of a guiding and centering device which ensures an exact alignment and precise guidance of one of the mold halves to the other mold half with maximum load capacity already at centering start.

SUMMARY OF THE INVENTION

The object of the present invention is thus to create a guiding and centering device which ensures the desired guiding and centering accuracy without the need of additional fine centering units such as flat centering device. Furthermore, it is an object of the present invention to provide a guiding and centering device, the wear of which being able to be kept as low as possible and a play-free guidance already from the centering start until the end being provided, so that these guiding and centering devices have a long service life and the replacement cycles can be reduced. Still another object of the present invention is to create a guiding and centering device which can be used as a play-free fine centering system, applicable without or minimal lubricants and which is configured to be adaptable to different molding tools.

These objects are achieved according to the invention by a guiding and centering device for a forming tool, in particular an injection molding or die-casting tool, comprising a first mold half and a second mold half, which are guided by guide means from a closed position, in which respective separating surfaces of both mold halves are pressed against one another, into an opened position and vice versa. A plurality of guiding and centering devices can be arranged at the forming tool. Each guiding and centering device comprises a protruding guiding body formed from a guiding column as a circular cylindrical bolt provided at the first mold half, a guiding recess formed as a bush with a circular cylindrical inner surface provided at the second mold half and a rolling element cage with rolling elements inserted in rows, by means of which the two mold halves are guided into and precisely centered in the closed position.

Advantageously, the guiding and centering device according to the present invention offers a play-free guidance with high repeatability along the entire stroke path with precision and accuracy. This is achieved inter alia by the preloaded rolling guidance due to the rolling element cage and the pairing of bush, bolt and rolling element cage. Furthermore, the high precision in positioning of the mold halves is obtained significantly far before the closed position is reached such that the wear on the contact surfaces of the mold halves is reduced, even at high traverse speed.

According to the present invention, the rolling element cage is supported by the circular cylindrical inner surface of the bush and positioned via positioning means in such a way that when closing the forming tool the circular cylindrical bolt runs practically simultaneously in a first row of rolling elements and a second row of rolling elements of the rolling element cage.

Due to the advantage of the roller bearing provided by the rolling element cage of the arrangement the need for lubricants is reduced to a minimum.

With this arrangement of the guiding and centering device according to the present invention it is achieved that when the forming tool is closed the circular cylindrical bolt runs practically simultaneously in the first row of rolling elements and the second row of rolling elements, so that a high initial load capacity already at centering start is obtained. Furthermore, the load on the rolling elements and the supporting or centering surfaces can be divided, which decreases the wear and increases the service life of the guiding and centering device. This matter is advantageous over centering systems of prior art, in particular configured as a guide block system, wherein a very high surface pressure during initial engagement increases wear of the centering surfaces.

Depending on the geometric configuration of the guiding and centering device, the cage with the rolling elements can comprise further rows of rolling elements to improve the centering.

In one preferred embodiment of the present invention the positioning means adapted to precisely arrange the cage of the rolling elements such that almost two rows of roller elements are simultaneously engaged in preload during guiding and centering comprise a spring element and an axial retainer element, between which the cage with the rolling elements are axially positioned at the circular cylindrical inner surface of the bush.

Advantageously, a compression spring as the spring element is inserted into the bush, in particular arranged between a supporting means at one end of the bush and the rolling element cage provided inside the bush at an opposite end thereof such that the spring element acts as a biasing element of the cage with rolling elements. Accordingly, the rolling element cage is positioned by the spring element and abuts against the axial retainer element such that the rolling element cage is in the correct position when the molding tool is open. The axial retainer element together with the spring element positions the rolling element cage and can be used for tools which move out of the engagement.

In a preferred embodiment of the present invention a shoulder protruding inwardly from the circular cylindrical inner surface of the bush and/or a groove provided at the circular cylindrical inner surface of the bush, in which a circlip is insertable is formed at the end portions of the circular cylindrical inner surface such that the positioning means are supported. For example, at one end portion of the circular cylindrical inner surface a shoulder is formed which provides a support for the spring element and at an opposite end portion of the circular cylindrical inner surface a groove is provided in which a circlip or snap ring is inserted forming the axial retainer element. Therefore, inside the bush an axial arrangement comprising the spring element biasing against the rolling element cage from one side and the rolling element cage retained in position by the axial retainer element from the other side guarantees a precise axial positioning. This achieves the desired precise positioned arrangement of the cage with rolling elements inside the bush which can be produced in a simple and inexpensive manner.

Alternative embodiments of the bush for positioning the arrangement inside the bush are possible. For example, both end portions of the circular cylindrical inner surface can be formed with a shoulder or with a groove.

The configuration of the spring element has to be such that, when the rolling element cage is in a centering start position, the spring element generates enough biasing force that at least the first row and the second row of rolling elements enter the preload. In the position when the mold is closed the spring force must not be too high, otherwise the rolling element cage is pressed through the preload. The spring element is configured that the rolling element cage is accurately positioned in the open position of the forming tool and furthermore is independent from the mounting position of the guiding and centering device in the forming tool.

In another preferred embodiment of the present invention, the bush and/or the guide column formed from the circular cylindrical bolt have a lead-in geometry at their entering portions. In a preferred embodiment the lead-in geometry of the bush is configured with an edge which is directed towards the rolling element cage and configures the end of the circular cylindrical inner surface and which merges into a second circular cylindrical inner surface. Therefore, the point at which the full preload force is reached on the rolling elements is precisely defined.

The circular cylindrical bolt can be provided with an edge concluding the circular circumferential surface thereof and which transits into a conical retracting area forming the lead-in geometry of the head of the bolt.

The bush is provided at the second mold half, in particular can be connected to the second mold half. Connecting the bush to the second mold half is via a locking member, which is insertable into one of a series of circumferential grooves surrounding the bush and formed along an axial length of the bush and which protrudes into a recess formed at the second mold half.

Furthermore, the guide column configured as the circular cylindrical bolt is connectable to the first mold half via a locking member. The locking member is configured to be insertable into one of a series of circumferential grooves surrounding the bolt and formed along an axial length of the bolt and wherein the insertable locking member protrudes into a recess formed at the first mold half.

The locking member can be configured as a circlip, a snap ring or ring parts. Preferably, the locking member is configured as two ring parts which can be inserted both into one of the circumferential grooves forming a full ring structure. Furthermore, the ring structure is formed with a circumferential slot adapted to incorporate a seal ring such that the two ring parts are securely fastened in the circumferential groove of the bush.

Advantageously, fastening the bush in the second mold half and the guide column formed from the circular cylindrical bolt via these locking members which can be positioned individually along at least a part of the axial length of the bush and along the length of the bolt, provides an individual positioning of the bush and the bolt and allows the use of the guiding and centering device in different situations, for example independent from the size of the plates used in the molding tool, in particular adaptable to the thickness of the plates.

In another preferred embodiment of the present invention, at least one of the bush and the circular cylindrical bolt is configured with a lead-in geometry. The bolt running in the rolling element cage advantageously can have a lead-in geometry at a head thereof formed from a conical retraction region adjacent to an edge concluding the circular circumferential surface.

In another embodiment the bush is provided with a lead-in geometry such that the circular cylindrical inner surface of the bush is concluded by an edge and adjacent to the edge a second circular cylindrical inner surface is provided, which has a greater diameter than the circular cylindrical inner surface. Preferably, the circular cylindrical inner surface of the bush transits in the region of the edge into the second circular cylindrical inner surface with a rounding or a curvature which can be adapted to the rounding of the rolling elements. As a result, the entering of the bolt into the rolling element cage is such that the rolling element cage is not stressed too much, which in turn is advantageous for the service life.

In one preferred embodiment, the rolling elements are rollers or balls, which results in a simple structure of the rolling element cage that can be manufactured at low costs. Furthermore, since the rolling elements are configured to provide a rolling centering rather than a gliding centering and to provide a line contact the wear is lowered significantly.

The guiding and centering device according to the present invention offers a simple and flexible arrangement, which can be easily installed and arranged to provide a backlash-free guide and centering. Furthermore, with the guiding and centering device of the present invention a very low abrasion and low wear can be achieved such that it is suitable for clean room applications and allow a wide range of applications, including long and short stoke applications. The guiding and centering device offers a compact arrangement which can be installed in the forming tool as a plug-and play solution.

Another advantage of the guiding and centering device according to the present invention is that the bush is compatible with a variety of guide columns complying with the same tolerances such that it is not necessary to use a specific guide column with the bush comprising the rolling element cage. Therefore, guiding and centering device offers compatibility and interchangeability and furthermore a so-called two-in one solution such that no guiding device and separate fine centering device is necessary. Therefore, no additional fine centering devices is needed since the guiding and centering device combines both guidance and fine centering.

BRIEF DESCRIPTION OF THE FIGURES

For a more complete understanding of the invention and the advantages thereof, exemplary embodiments of the invention are explained in more detail in the following description with reference to the accompanying figures, in which like reference characters designate like parts and in which.

DETAILED DESCRIPTION

The accompanying drawings are included to provide a further understanding of the present invention and are incorporated in and constitute a part of this specification. The drawings illustrate particular embodiments of the invention and together with the description serve to explain the principles of the invention.

Figure 1:
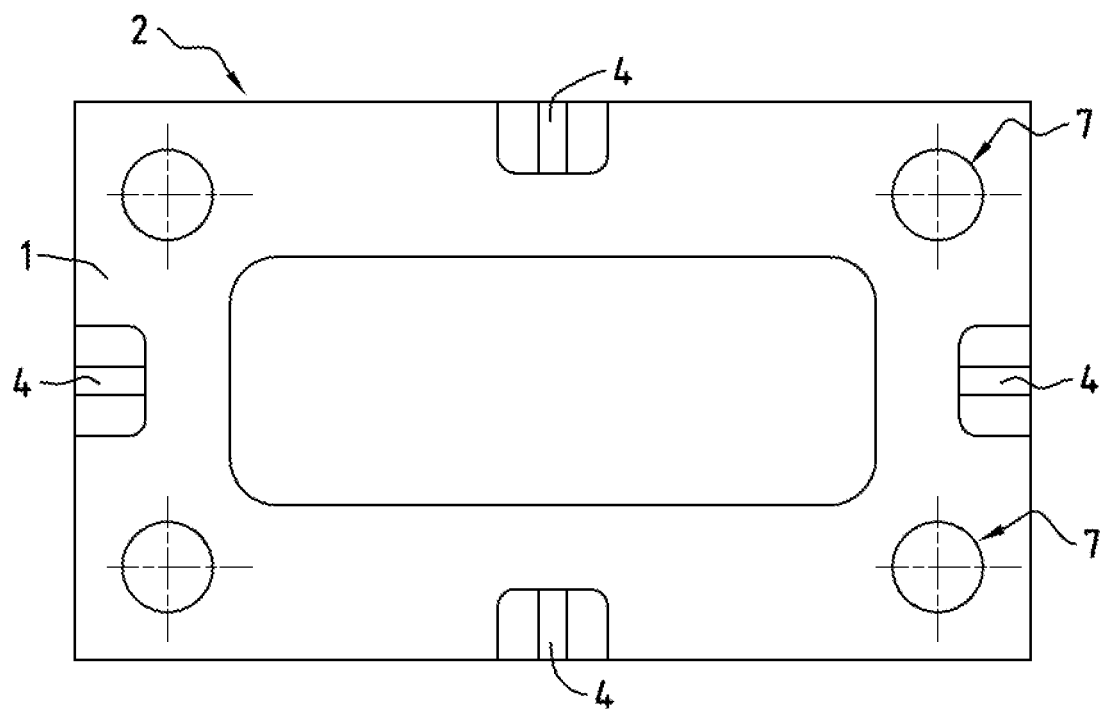
FIG. 1 is a schematically guiding and centering device according to prior art.

Referring to FIG. 1 shows a known mold configuration with a centering device and guide means. In a first mold half 1 of a forming tool 2 protruding guide bodies 4, which have the shape of cuboids are fastened in the region of the separating surface 3. Other forms of the protruding guide bodies are known such as conical or cylindrical. Furthermore, guide means 7 formed from known guide columns are positioned to guide the forming tool 2 during movement. Not shown in FIG. 1. on a second half mode 5 of the forming tool 2, guide recesses 6 are provided which have the shape of slots and which correspond to the guide bodies 4 of the first mold half 1. In the closed state of the molding tool 2, the guide bodies 4 are located in the guide recesses 6 enabling optimal alignment of the first mold half 1 with the second mold half 5. Due to the design of the guide bodies 4 and the guide recesses 6, these must be used at least in pairs and twice to order to be able to center in all directions. Therefore, the guide bodies 4 and the guide recesses 6 have to be arranged essentially opposite one another, which can result in space problems. In this known centering device, the surface pressure acting on the guide body and the guide recess can be very high. Furthermore, the corresponding guide surfaces must be moved against each other in a sliding manner, resulting in high wear, which in turns means that these centering devices have to be replaced after a certain time.

Figure 2:
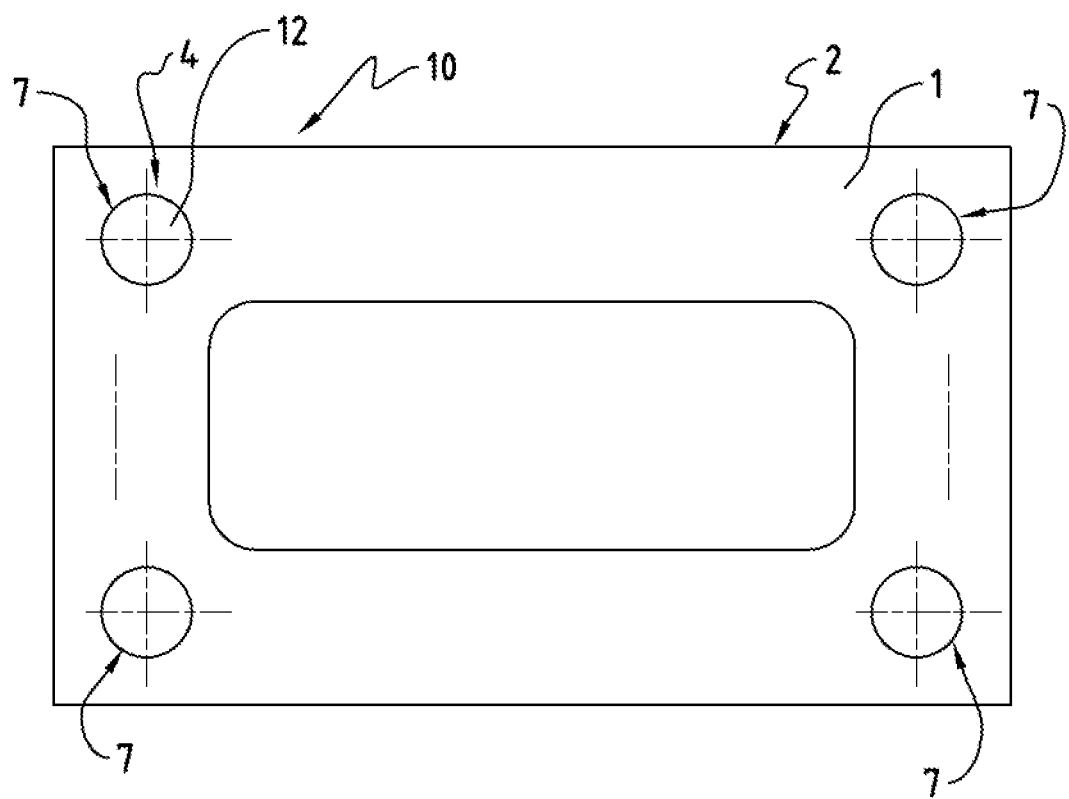
FIG. 2 is a schematically guiding and centering device according to an embodiment of the invention.
Figure 3:
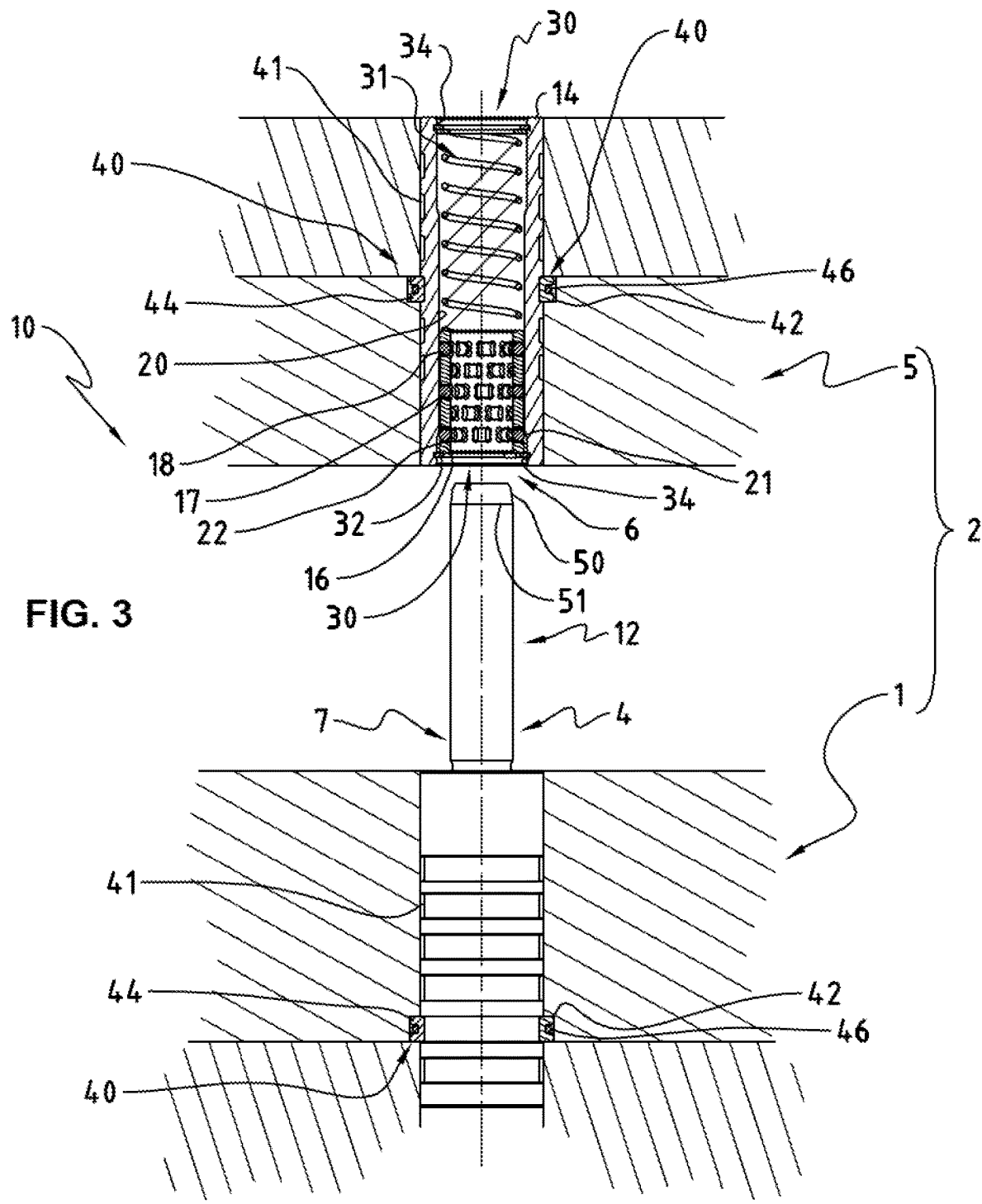
FIG. 3 is a schematically guiding and centering device in section according to the embodiment of the invention.

Referring to FIG. 2 and FIG. 3 showing a guiding and centering device 10 according to the invention in a possible arrangement in the forming tool 2. According to this embodiment, each protruding guide body 4 is formed from a circular cylindrical bolt 12, in particular the guide columns of the guide means 7. Each guide recess 6 is formed from a bush 14 with a circular cylindrical inner surface 20 supporting a rolling element cage 16 with rolling elements 17 inserted in rows 18. The circular cylindrical bolt 12 runs in the rolling elements 17 of the rolling element cage 16 when the forming tool 2 is closed. FIG. 2 shows a view of the first mold half 1 of the forming tool 2, in particular the molding tool, comprising guide means 7 designed as guide columns known in prior art and formed from the circular cylindrical bolt 12 according to the invention. Therefore, in the embodiment shown, four such bolts 12 are inserted into the first mold half 1 as in general the forming tool 2 comprises four guiding sets. Principally, for obtaining an optimal centering two bolts 12 are required, but any number of bolts 12 can be used in the forming tool 2, depending on the size and configuration of the forming tool 2.

FIG. 3 shows a view of the forming tool 2 with the first mold half 1 with an arranged circular cylindrical bolt 12 as the guide body 4, in particular the guide columns of the guide means 7 and of the second mold half 5 with an arranged bush 14 in which a rolling element cage 16 is inserted in an open position.

The guide recess 6, which is configured as the bush 14 with a circular cylindrical inner surface 20, is fastened in the second mold half 5 of the forming tool 2, as will be described later. The rolling element cage 16 is inserted into the bush 14 supported by the circular cylindrical inner surface 20. The rolling element cage 16 comprises rolling elements 17 arranged in rows 18, wherein the rolling elements 17 can be configured as rollers or balls.

For positioning the rolling element cage 16 positioning means 30 are provided. According to one embodiment shown in FIG. 3 positioning means 30 comprise a retainer element 32 formed from a circlip 34 or a snap ring positioned near an opening of the bush 14 toward the circular cylindrical bolt 12, wherein the circlip 34 is inserted into a groove provided in the circular cylindrical inner surface 20. Furthermore, the positioning means 30 comprise a spring element 31 configured to bias the rolling element cage 16 from an opposite end therefrom toward the retainer element 32. An end of the spring element 31 facing away from the rolling element cage 16 is supported by a stop element, which can be formed from another circlip 34 inserted into a groove provided at the circular cylindrical inner surface 20 at an end portion opposite the opening for inserting the bolt 12 or by a shoulder protruding inwardly from the circular cylindrical inner surface 20. The spring element 31 formed from a compression spring presses the rolling element cage 16 against the retainer element 32, which means that the rolling element cage 16 is in the correct position when the forming tool 2 is open. The correct position of the rolling element cage 16 is such that when closing the forming tool 2 the circular cylindrical bolt 12 runs practically simultaneously on the first row of the rolling elements 17 and the second row of rolling elements 17 at the same time, whereby the load on the rolling elements 17 and them supporting surfaces can be divided, which results in increased service life, shown in detail in FIGS. 4a, 4b.

Advantageously, the bush 14 is provided with an entrance portion with a lead-in geometry comprising an edge 21 concluding the circular cylindrical inner surface 20 and providing a transition into a second circular cylindrical inner surface 22. As a result, the point at which the full preload force is reached on the rolling elements 17 is precisely defined, with the rolling elements 17 being driven gently through the conical retraction area 22. The circular cylindrical bolt 12 is configured with a lead-in geometry at a head of the bolt 12, such that the bolt 12 can be easily inserted into the rolling element cage 16, as described later.

A further advantageous embodiment of the invention is that the bush 14 can be positioned relative to the second mold half 5 and the bolt 12 can be positioned relative to the first mold half 1 by means of a locking member 40 providing individual position and variability of the dimensions, in particular thickness of the plates of the forming tool 2. The locking member 40 is formed as a ring or ring parts 44 which are insertable into a circumferential groove 41. Therefore, a series of circumferential grooves 41 surrounding the bush 14 and/or the bolt 12 and formed along an axial length thereof is formed. The ring or ring parts 44 inserted into one of the circumferential grooves 41 protrudes into a recess 42 of the plates of the forming tool 2. The recess 42 can be formed from a shoulder between plates.

As can be seen from FIG. 3 the guide body 4 can be fastened to the first mold half 1 in a similar way via locking member 40 inserted into a circumferential groove 41 formed at an outer surface of the guide body 4 and protruding into a recess 42 formed in the first mold half 1 or between plates forming the first mold half 1.

Figure 4A:
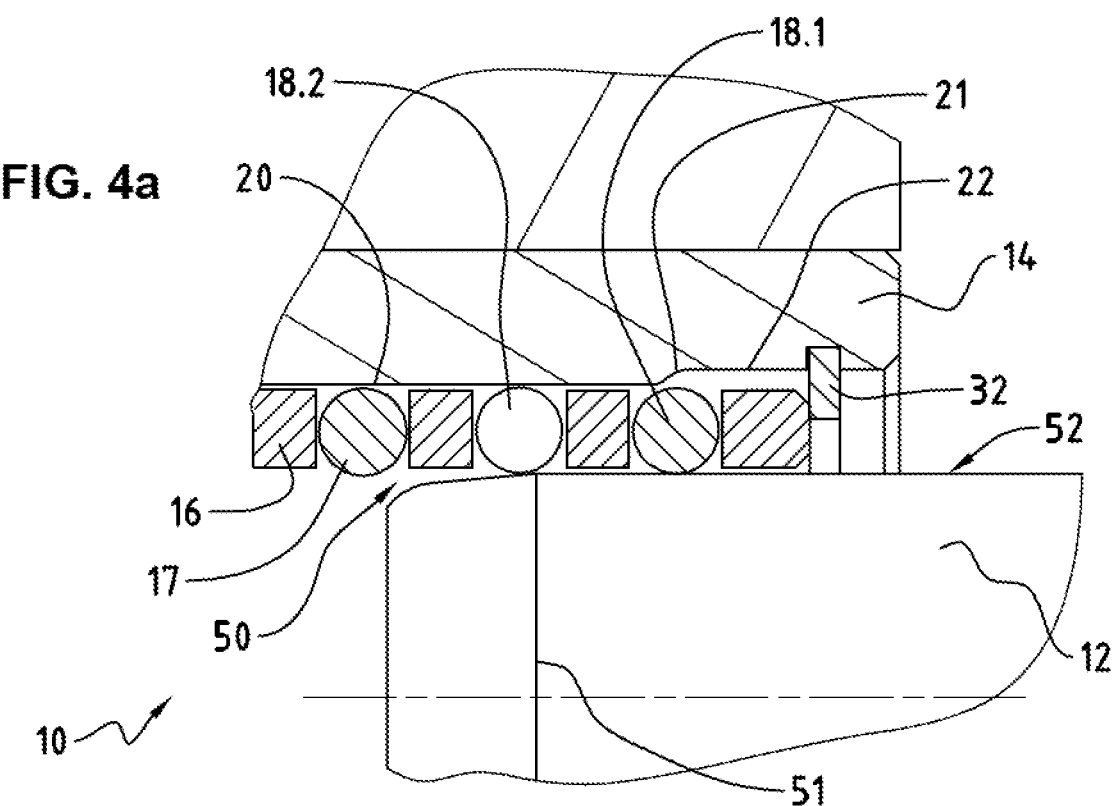
FIG. 4a is a schematically guiding and centering device partly in section according to the embodiment of the invention showing the movement of the guide body into the guide recess when the forming tool is closing.
Figure 4B:
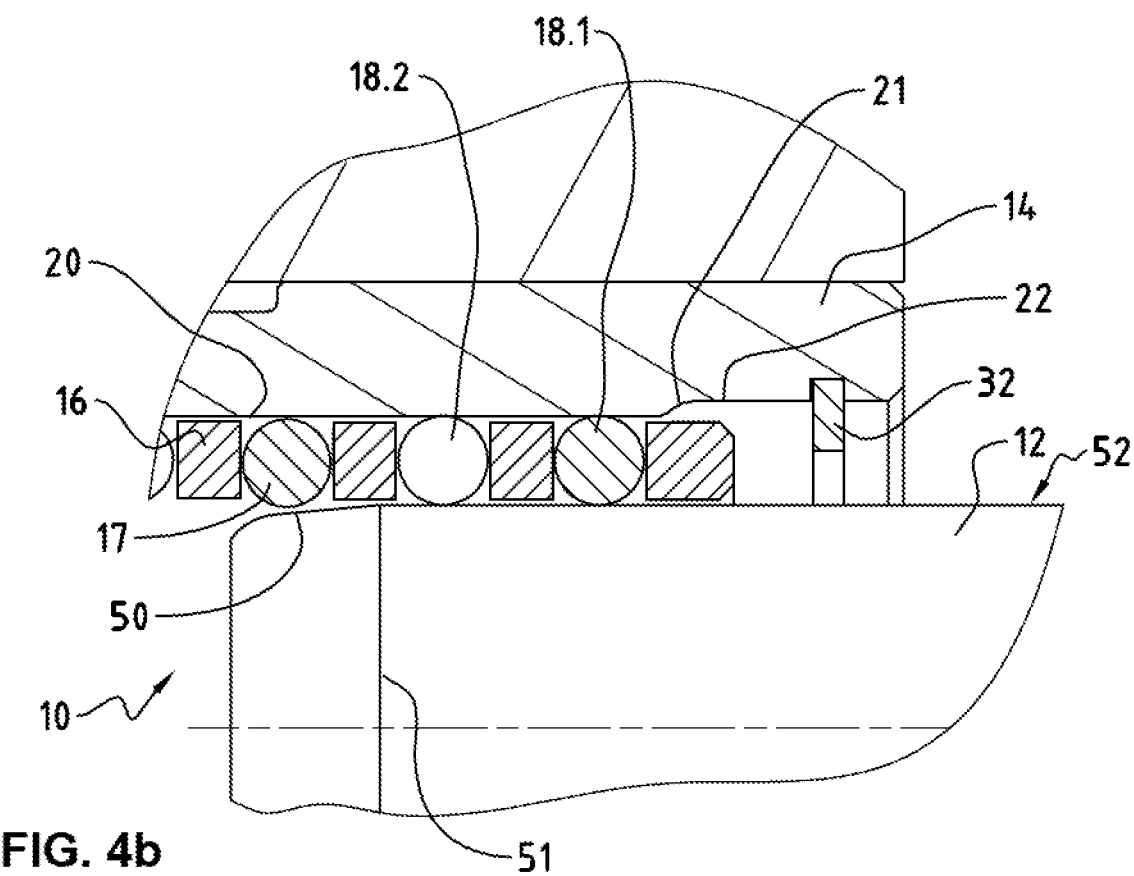
FIG. 4b is a schematically guiding and centering device partly in section according to the embodiment of the invention shown in FIG. 4a in another position when closing the forming tool.

FIGS. 4a and 4b show in section and enlarged details of the guiding and centering device 10 when the forming tool 2 is closing. Thereby, the circular cylindrical bolt 12 runs into the rolling element cage 16 positioned in the bush 14 via positioning means 30 formed as the spring element 31 (not shown) and the retainer element 32. The bush 14 has the circular cylindrical inner surface 20 which is concluded by an edge 21. Adjoining to the edge 21 a transition region is configured such to transit from the edge 21 into a second circular cylindrical inner surface 22 which has a greater diameter than the circular cylindrical inner surface 20. The transition region between the inner surfaces 20; 22 can be formed with a rounding or curvature which is preferably adapted to the rounding of the rolling elements 17. Furthermore, the circular cylindrical bolt 12 has a circular circumferential surface 52, which is concluded by an edge 51. Adjoining to the edge 51 the head of the bolt 12 is formed from a conical retraction area 50, which provides the lead-in geometry.

When the forming mold 2 is closing the circular cylindrical bolt 12 runs into the rolling element cage 16 with the lead-in geometry formed from the conical retraction area 50. As can be seen from FIG. 4a the bolt 12 passes over a first row 18.1 of rolling elements 17 arranged in the rolling element cage 16, since the rolling elements 17 of the first row 18.1 are located in the area of the second circular cylindrical inner surface 22, in particular in the region of the edge 21 and therefore in a relation to the bush 14 in a retracted position. As the circular cylindrical bolt 12 advances further, the edge 51 of the bolt 12 comes into contact with the second row 18.2 of the rolling elements 17 arranged in the rolling element cage 16. As soon as the edge 51 of the bolt 12 passes over the rollers 17 of the first row 18.1, these rolling elements 17 begin to rotate, the rolling element cage 16 is pushed into the bush 14 and sets the rolling elements 17 of the second row 18.2 in motion, as can be seen from FIG. 4*b*. With this arrangement, the rolling elements 17 of the first row 18.1 and of the second row 18.2 come under pretension practically at the same time, whereby the load can be divided.

During the further closing process of the forming tool 2, the circular cylindrical bolt 12 passes over the rolling elements 17 of further rows 18, which are arranged in the rolling element cage 16. In the complete closed position of the forming mold 2, the circular cylindrical bolt 12 is pushed into the rolling element cage 16 and thus the centering forces are transmitted from the rolling elements 17 of the rolling element cage 16. By opening the forming tool 2, the bolt 12 is retracted out of the bush 14 and the rolling element cage 16 is positioned accordingly such that the next centering process can be performed in an optimal manner.

Figure 5:
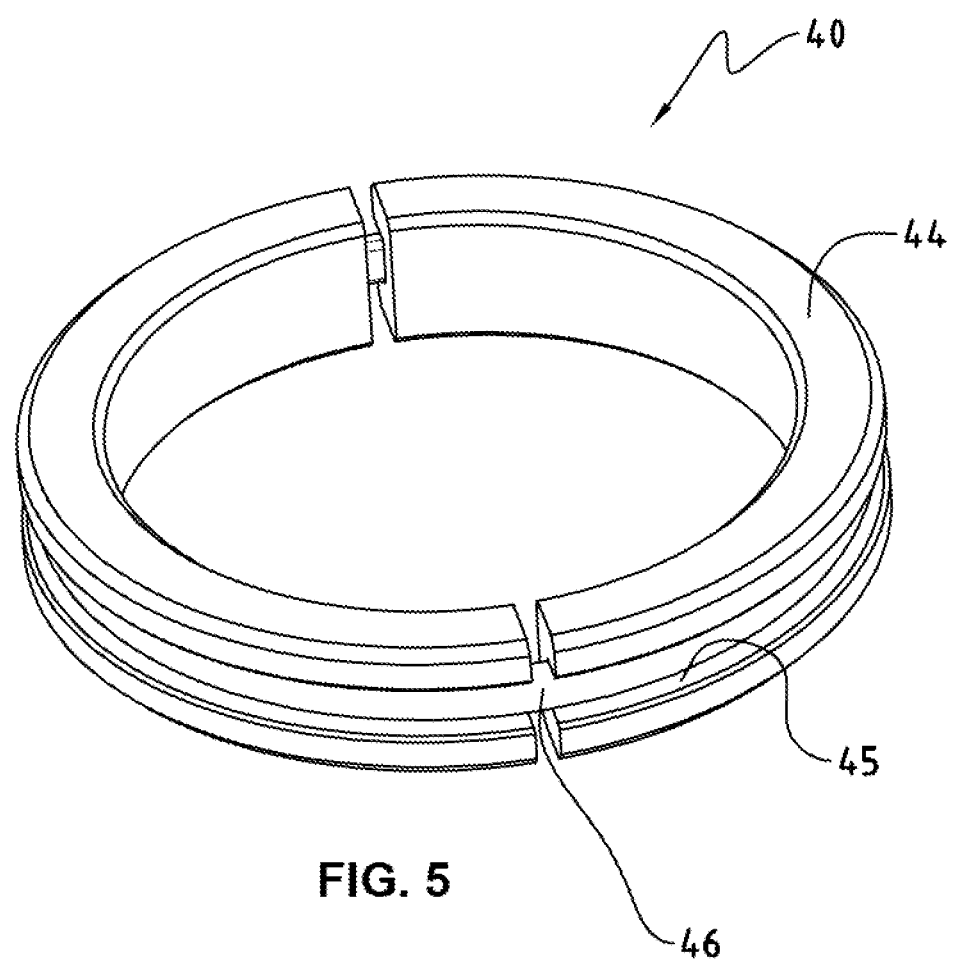
FIG. 5 is a schematically locking element of an embodiment of the invention for positioning the guiding and centering device relative to the forming tool.

In FIG. 5 the locking member 40 is shown in a perspective view. The locking member 40 is formed from two halves of a ring 44. The ring 44 provides a circumferential slot 45 configured that a seal ring 46 can be inserted to hold the halves of the ring together. With this arrangement it is easy to position the bush 14 in a predetermined position in the second mold half 5 and the bolt 12 in the first mold half 1. Therefore, the guiding and centering device 10 can be adapted to different dimensions of the plates of the forming mold 2 providing a universal applicable guiding and centering device with optimal centering and guiding properties.

The invention claimed is:

1. Guiding and centering device for a forming tool comprising a first mold half and a second mold half which are guided by a guide between a closed position in which respective separating surfaces of both mold halves are pressed against one another, into an opened position and vice versa,
   the guiding and centering device comprising a protruding guiding body formed as a circular cylindrical bolt provided at the first mold half, a guiding recess formed as a bush with a first circular cylindrical inner surface provided at the second mold half, and a rolling element cage with rolling elements inserted in rows, by means of which the first and second mold halves are guided and precisely centered in the closed position, wherein the rolling element cage is supported by the first circular cylindrical inner surface of the bush and positioned via a positioner in such a way that when closing the forming tool, at least during an initial engagement, the circular cylindrical bolt runs substantially simultaneously in a first row of rolling elements and a second row of rolling elements of the rolling element cage, while the first row of rolling elements and the second row of rolling elements pass over a head of the circular cylindrical bolt without contact.

2. Guiding and centering device for a forming tool according to claim 1, wherein the positioner is formed from a spring element and an axial retainer element arranged such that the rolling element cage is axially positioned in the bush between them.

3. Guiding and centering device for a forming tool according to claim 1, wherein a groove is provided at an end portion of the first circular cylindrical inner surface of the bush, in which a circlip is insertable to axially position the positioner.

4. Guiding and centering device for a forming tool according to claim 1, wherein a shoulder is formed at an end portion of the first circular cylindrical inner surface of the bush which forms a support of the positioner.

5. Guiding and centering device for a forming tool according to claim 1, wherein connecting the bush to the second mold half is via a locking member, which is insertable into one of a series of circumferential grooves surrounding the bush and formed along an axial length of the bush and which protrudes into a recess formed at the second mold half.

6. Guiding and centering device for a forming tool according to claim 5, wherein the locking member is formed from a circlip.

7. Guiding and centering device for a forming tool according to claim 5, wherein the locking member is formed from two ring parts with a circumferential slot, which are connected to each other via a seal ring insertable into the slot.

8. Guiding and centering device for a forming tool according to claim 1, wherein connecting the circular cylindrical bolt to the first mold half is via a locking member, which is insertable into a series of circumferential grooves surrounding the bolt and formed along an axial length of the bolt and which protrudes into a recess formed at the first mold half.

9. Guiding and centering device for a forming tool according to claim 8, wherein the locking member is formed from a circlip.

10. Guiding and centering device for a forming tool according to claim 8, wherein the locking member is formed from two ring parts with a circumferential slot, which are connected to each other via a seal ring insertable into the slot.

11. Guiding and centering device for a forming tool according to claim 1, wherein the bush and/or the circular cylindrical bolt are configured with a lead-in geometry.

12. Guiding and centering device for a forming tool according to claim 1, wherein the circular cylindrical bolt has a conical retraction region adjacent to an edge, which concludes a circular circumferential surface of the bolt.

13. Guiding and centering device for a forming tool according to claim 1, wherein the first circular cylindrical inner surface of the bush is concluded by an edge adjacent to which a second circular cylindrical inner surface is formed, the second circular inner surface having a greater diameter than the first circular cylindrical inner surface.

14. Guiding and centering device for a forming tool according to claim 13, wherein the edge transits from the first circular cylindrical inner surface to the second circular cylindrical inner surface with a curvature, which is adapted to a curvature of the rolling elements.

15. Guiding and centering device for a forming tool according to claim 1, wherein the rolling elements are rollers or balls.

* * * * *